(12) United States Patent
Potts et al.

(10) Patent No.: US 11,724,469 B2
(45) Date of Patent: Aug. 15, 2023

(54) TOOL FOR CURING A COMPOSITE COMPONENT

(71) Applicant: Safran Seats GB Limited, Cwmbran (GB)

(72) Inventors: Nicholas Potts, Cwmbran (GB); Bhaskar Biswas, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 0 days.

(21) Appl. No.: 17/706,456

(22) Filed: Mar. 28, 2022

(65) Prior Publication Data

US 2022/0219413 A1 Jul. 14, 2022

Related U.S. Application Data

(63) Continuation of application No. 15/040,505, filed on Feb. 10, 2016, now Pat. No. 11,305,499.

(30) Foreign Application Priority Data

Feb. 12, 2015 (GB) ..................................... 1502323

(51) Int. Cl.
*B29C 70/54* (2006.01)
*B29C 70/44* (2006.01)
(Continued)

(52) U.S. Cl.
CPC ............ *B29C 70/543* (2013.01); *B29C 70/44* (2013.01); *B29C 70/549* (2021.05); *B29C 33/02* (2013.01);
(Continued)

(58) Field of Classification Search
None
See application file for complete search history.

(56) References Cited

U.S. PATENT DOCUMENTS

| 3,124,842 A | 3/1964 | Moormann |
| 3,700,511 A | 10/1972 | Whitney |

(Continued)

FOREIGN PATENT DOCUMENTS

| CA | 2435575 | | 8/2002 |
| CA | 2551728 | * | 1/2008 |

(Continued)

OTHER PUBLICATIONS

United Kingdom Patent Application No. 1502323.7, Search Report, dated Mar. 9, 2016.

(Continued)

*Primary Examiner* — Robert B Davis
(74) *Attorney, Agent, or Firm* — Kilpatrick Townsend & Stockton LLP (57) ABSTRACT

The present invention provides a tool 1 for curing a composite component, the tool comprising a lay-up surface 8 for laying-up layers of an uncured composite component, a cover assembly 9 for moving in relation to the lay-up surface to cover a layed-up uncured composite component on the lay-up surface, the cover assembly comprising a sealable cover for sealing around the uncured composite component on the lay-up surface to form a sealed zone, and a vacuum port 25 for providing a vacuum to the sealed zone, wherein the tool further comprises at least one heating element 15, 53 within the sealed zone for heating the uncured composite component. The invention also provides a method of manufacturing a composite component and a composite component. The composite component may form at least part of a piece of aircraft furniture, such as an aircraft seat shell.

12 Claims, 9 Drawing Sheets

(51) Int. Cl.
    *B29C 33/02*     (2006.01)
    *B29C 70/68*     (2006.01)
    *B32B 27/08*     (2006.01)
    *B32B 37/00*     (2006.01)
    *B32B 37/10*     (2006.01)
    *B32B 38/18*     (2006.01)

(52) U.S. Cl.
    CPC ........ *B29C 70/68* (2013.01); *B29C 2033/023* (2013.01); *B32B 27/08* (2013.01); *B32B 37/0046* (2013.01); *B32B 37/1018* (2013.01); *B32B 38/1808* (2013.01); *B32B 2605/18* (2013.01)

(56) References Cited

U.S. PATENT DOCUMENTS

| | | |
|---|---|---|
| 4,421,589 A | 12/1983 | Armini et al. |
| 5,066,442 A | 11/1991 | Gutowski |
| 5,236,646 A | 8/1993 | Cochran et al. |
| 5,283,026 A | 2/1994 | Okumura |
| 5,630,894 A * | 5/1997 | Koch ................ B65C 9/24 156/286 |
| 5,824,249 A | 10/1998 | Leitch et al. |
| 6,146,578 A | 11/2000 | Van Ert |
| 6,254,812 B1 | 7/2001 | Goodridge et al. |
| 6,338,618 B1 | 1/2002 | Van Ert |
| 8,308,889 B2 | 11/2012 | Glancy et al. |
| 9,056,413 B1 | 6/2015 | Cox |
| 2004/0113315 A1 | 6/2004 | Graham |
| 2004/0222562 A1 | 11/2004 | Kirchner |
| 2006/0011294 A1 | 1/2006 | Rajabali |
| 2008/0277058 A1 | 11/2008 | Schmier, II et al. |
| 2010/0239865 A1 | 9/2010 | Kallinen |
| 2010/0269978 A1 | 10/2010 | Marengo |
| 2011/0254189 A1 | 10/2011 | Doyle et al. |
| 2012/0018089 A1 | 1/2012 | Gueret |
| 2012/0023727 A1 | 2/2012 | Meyer et al. |
| 2013/0108837 A1 | 5/2013 | Blot |
| 2014/0048966 A1 | 2/2014 | Schmier |
| 2014/0090766 A1 | 4/2014 | Lockleer et al. |
| 2014/0159267 A1 | 6/2014 | Murch et al. |
| 2014/0212616 A1 | 7/2014 | McKelvey Campbell |
| 2014/0361455 A1 | 12/2014 | Murai |
| 2016/0101575 A1 | 4/2016 | Ashtari |
| 2016/0107357 A1 | 4/2016 | Lin |

FOREIGN PATENT DOCUMENTS

| | | | |
|---|---|---|---|
| CA | 2593163 | | 1/2008 |
| EP | 2698242 | | 2/2014 |
| GB | 0859941 | | 1/1961 |
| GB | 940407 | A * | 3/1962 |
| GB | 0940407 | | 10/1963 |
| GB | 2454881 | | 5/2009 |
| WO | 2008020158 | | 2/2008 |
| WO | 2009007077 | | 1/2009 |

OTHER PUBLICATIONS

Europe Patent Application No. 16155190.8, Partial Search Report, dated Jul. 11, 2016.
Europe Patent Application No. 19189719.8, Extended European Search Report, dated Dec. 11, 2019.
United Kingdom Kingdom Patent Application No. 1502323.7, Examination Report, dated Apr. 9, 2020.
U.S. Appl. No. 15/040,505, Restriction Requirement, dated May 1, 2018.
U.S. Appl. No. 15/040,505, Non-Final Rejection, dated Jul. 26, 2018.
U.S. Appl. No. 15/040,505, Final Rejection, dated Feb. 5, 2019.
U.S. Appl. No. 15/040,505, Advisory Action, dated May 16, 2019.
U.S. Appl. No. 15/040,505, Non-Final Rejection, dated Oct. 18, 2019.
U.S. Appl. No. 15/040,505, Final Rejection, dated Jul. 23, 2020.
U.S. Appl. No. 15/040,505, Non-Final Rejection, dated Apr. 8, 2021.
U.S. Appl. No. 15/040,505, Notice of Allowance, dated Dec. 15, 2021.
Europe Patent Application No. 19189719.8, Examination Report (Communication pursuant to Article 94(3) EPC), dated May 11, 2022, 4 pages.

* cited by examiner

TOOL FOR CURING A COMPOSITE COMPONENT

CROSS REFERENCE TO RELATED APPLICATION

This application is a continuation of U.S. patent application Ser. No. 15/040,505, filed Feb. 10, 2016, which claims the benefit of United Kingdom Patent Application No. 1502323.7 filed Feb. 12, 2015, both of which are hereby incorporated by reference in their entireties.

BACKGROUND OF THE INVENTION

The present invention concerns a tool for curing a composite component, the tool comprising a lay-up surface for laying-up layers of an uncured composite component. The invention also concerns a method of manufacturing a composite component and a composite component. The composite component may form at least part of a piece of aircraft furniture, such as an aircraft seat shell.

Seat shells for aircraft are often manufactured using composite laminate materials. The reason for using composite materials in the structure mostly is due to its lightweight and superior strength-to-weight properties of the material. These composite materials could be monolithic or sandwich composite laminates or a combination. The constituent materials for monolithic composite laminates are pre-impregnated materials (prepregs of resin impregnated fibres) whereas for sandwich composite laminates they are prepregs and a core material (e.g. honeycomb, foam). Honeycomb materials are preferable as a core material. Prepregs may be made with glass and/or carbon fibres impregnated with thermoset resin (e.g. phenolic or epoxy resin). The honeycombs core may be made with aramide based paper. Prepregs are often stored in freezers to ensure they are kept under the correct conditions.

The composite materials are prepared in a clean room by laying up the prepregs (and cores) on a mould tool at room temperature. After being layed-up the composite materials are bagged up using a polytetrafluoroethylene (PTFE) release film (if required), a rubber intensifier layer (to enable a uniform pressure to be applied on the composite component), a breather layer (to absorb excess resin) and then nylon bagging materials. A vacuum is then applied through a port in the nylon bagging (known as de-bulking). The mould tool with these bagged up materials is transferred to an oven or autoclave where the materials are connected to a different vacuum port and taken through a heating cycle (typically, heating to 135° C. and remaining at that temperature for a certain period of time depending upon the prepregs, typically 1 hour for phenolic resin prepregs) to cure the material. The materials are allowed to cool down to room temperature before extracting the cured and moulded laminate off the tool.

Following the curing of the material, the moulded part is machined into the required shape and profile as per the engineering design and then passed through an assembly line to attach metal and plastic bonding attachments, cushions and electrical components to complete the seat structure for the aircraft.

This process has many disadvantages. For example:
1) The process can be very long, and therefore expensive, due to operating and man power costs. For example,
   a. Laying-up of the part can take up to 1.5 days due to the difficulties in laying-up prepregs, particularly when it is required to drape them over complex curved profiles.
   b. Moving layed-up composites in and out of the oven or autoclave can take 4 to 5 hours, due to the number of different components being cured in the oven or autoclave at once, and the need to attach each to its own vacuum supply in the oven or autoclave. Also, other components cannot be moved into or out of the oven or autoclave during the curing process, meaning there is a significant lead time in waiting for the oven or autoclave to be empty.
   c. The curing process can take 3 hours as the oven or autoclave can take a while to heat up to the desired temperature.
   d. CNC machining of the cured composite component can take up to half a day but the lead time in waiting for a machine may be half to 1.5 days.
   e. CNC (and other) machining of the cured component can produce a lot of dust, which needs to be extracted using a dust extraction system.
   f. It is time-consuming to apply the nylon bagging as it needs to be carefully sealed each time, using a sealant.
   g. Transferring the component to and from the CNC machine takes time.
2) The nylon bagging is not reusable and so creates waste.
3) An oven or autoclave is expensive and takes up a lot of space.
4) Laying-up may require the use of separate heating ovens, guns or blankets.
5) Separate vacuum supplies are required for de-bulking and during curing in the autoclave.
6) The process consumes a lot of energy and the equipment requires a large amount of maintenance.

The present invention seeks to mitigate the above-mentioned problems. Alternatively or additionally, the present invention seeks to provide an improved tool for curing a composite component.

SUMMARY OF THE INVENTION

The present invention provides, according to a first aspect, a tool for curing a composite component, the tool comprising a lay-up surface for laying-up layers of an uncured composite component, a cover assembly for moving in relation to the lay-up surface to cover a layed-up uncured composite component on the lay-up surface, the cover assembly comprising a sealable cover for sealing around the uncured composite component on the lay-up surface to form a sealed zone, and a vacuum port for providing a vacuum to the sealed zone, wherein the tool further comprises at least one heating element within the sealed zone for heating the uncured composite component.

Providing a tool with an "in-built" heating element allows the layers of uncured composite to be layed-up onto a warm lay-up surface, making lay-up quicker. There is also no need for separate and/or time-consuming heating equipment, such as a heating gun, oven or blanket.

In addition, the tool can be used for the curing process. The tool heats up more quickly to the desired temperature than an oven or autoclave, as the heat is provided within the sealed zone. The volume to be heated is also a lot smaller than the volume of a typical oven or autoclave.

The tool also takes up much less space and is cheaper than a typical autoclave. Typically, the tool may be portable and may be provided with holes for allowing it to be lifted by a fork-lift, or similar.

In addition, providing a moveable cover assembly and sealable cover allows a seal to be established around the uncured component quickly and easily. It does not require a separate sealant.

Further, there is no movement of the tool into and out of an oven or autoclave required. Also, the same vacuum source can be used for both de-bulking and curing.

The layers of the uncured composite component are typically prepregs layers. The composite component may be a monolithic or a sandwich component.

The lay-up surface may be formed of a composite material, such as a carbon fibre composite.

Preferably, the cover assembly comprises a cover heating element for heating an upper side of the layed-up uncured composite component.

More preferably, the cover heating element is attached to an underside of the sealable cover.

Preferably, the cover assembly is provided with an insulating layer (above the cover heating element) to prevent heat from the cover heating element escaping out of the cover assembly.

Preferably, the cover heating element comprises a heating blanket, for example formed of a wire mesh, or similar, embedded within a carrier material.

Preferably, the lay-up surface comprises a surface heating element for heating a lower side of the layed-up uncured composite component. This surface heating element could also be used to warm the layers during laying-up by heating the surface above ambient temperature. For example, the surface could be heated to a temperature of 40 to 50° C.

More preferably, the surface heating element is embedded beneath a top layer of the lay-up surface.

Providing heating elements on the upper and lower sides of a composite component allows more even heating and a more uniform composite structure.

The tool preferably further comprises a vacuum source, such as a vacuum pump, connected to the vacuum port.

Preferably, the vacuum port is provided in the cover assembly.

A vacuum port may, additionally or alternatively, be provided at the lay-up surface.

Preferably, the sealable cover is a shaped cover that holds its shape. The sealable cover therefore has a volume associated with it for containing the uncured composite component.

More preferably, the sealable cover is shaped such that it has a lower edge region that can seal around the lay-up surface and a roof region that holds its shape to extend above the lay-up surface.

Preferably, the sealable cover is movably mounted (for example, with a hinge) in relation to the lay-up surface.

Alternatively, or additionally the sealable cover is movably mounted to the tool.

Preferably, the sealable cover is supported by a frame structure. The frame makes the sealable cover easier to move and provides a guide to move the sealable cover over the lay-up surface (to move it on to or off from the lay-up surface).

The frame may comprise a hinge to enable the sealable cover to be pivoted over the lay-up surface. The frame structure may comprise a gas strut to aid lifting/pivoting up of the frame and/or to maintain the frame and sealable cover in a position away from the lay-up surface, for example during lay-up. The frame structure may be provided with at least one handle. This aids with control of moving the frame and the cover.

Preferably, the sealable cover is made of flexible material such that it flexes when the vacuum is provided to the sealed zone.

More preferably, the sealable cover is made of an elastomeric material. For example, the sealable cover may be made from a silicon based elastomeric material, such as one called Viton™.

Preferably, the tool further comprises a cooling apparatus for cooling the composite component. This allows the component to be cooled, and therefore removed earlier, from the tool. This reduces the tool time for the component and allows more components to be cured in a given time period.

More preferably, the cooling apparatus is located in the frame structure.

Even more preferably, the frame structure comprises a plurality of air outlets from which cooling air may be expelled.

Preferably, the frame structure comprises an internal airflow channel through which cooling air passes.

Preferably, the tool comprises a vortex tube for supplying cooling air.

Preferably, the lay-up surface comprises a main surface portion, provided with a number of attachment points for attaching raised portions on the main surface portion.

Preferably, the lay-up surface comprises a main surface portion and a number of raised portions on the main surface portion.

The raised portions provide a required geometric profile to allow the layers to be layed-up and layers to abut against the raised portions so that the same required profile of the component is achieved. The required profile may be an edge with, for example, a castellated shape or may be an internal hole and/or recessed area within the component. A raised portion may comprise a dowel (for example, made of nylon) for providing a hole in the component, for example, for a rivet or other fastener.

Preferably, the raised portions comprise through-holes for attaching the raised portions to corresponding attachment points on the main surface portion. The raised portions may be attached with fasteners, such as bolts.

The tool may be provided with sensors to sense the temperature and/or pressure inside the sealed zone.

The tool may also be provided with a data recorder to record the temperature and/or pressure inside the sealed zone. The data recorded may be able to be transferred to a portable data storage device for transferring to a computer or a similar tool. The second tool may then provide the same temperature and/or pressure profile during another curing process on another component. Having a set temperature and/or pressure profile associated with the curing of the components may aid in authentication or certification of the components.

The tool may be provided with a control panel that controls the tool to provide a required temperature and/or pressure. The control panel may be a programmable interface device (such as a proportional-integral-derivative controller, for keeping the heating and cooling rates constant) to allow the tool to provide a require temperature and/or pressure profile during curing.

According to a second aspect not of the invention there is also provided a tool for curing a composite component, the tool comprising a lay-up surface for laying-up layers of an uncured composite component, and a cover assembly for moving in relation to the lay-up surface to cover a layed-up uncured composite component on the lay-up surface, the cover assembly comprising a sealable cover for sealing around the uncured composite component on the lay-up surface to form a sealed zone, wherein the sealable cover comprises a shaped cover that holds its shape.

The sealable cover therefore has a volume associated with it for containing the uncured composite component.

Preferably, the sealable cover is shaped such that it has a lower edge region that can seal around the lay-up surface and a roof region that holds its shape to extend above the lay-up surface.

Preferably, the sealable cover is supported by a frame structure. The frame makes the sealable cover easier to move and provides a guide to move the sealable cover over the lay-up surface (to move it on to or off from the lay-up surface).

The frame may comprise a hinge to enable the sealable cover to be pivoted over the lay-up surface. The frame structure may comprise a gas strut to aid lifting/pivoting up of the frame and/or to maintain the frame and sealable cover in a position away from the lay-up surface, for example during lay-up. The frame structure may be provided with at least one handle. This aids with control of moving the frame and the cover.

Preferably, the tool further comprises at least one vacuum port for proving a vacuum to the sealed zone and wherein the sealable cover is made of flexible material such that it flexes when the vacuum is provided to the sealed zone.

More preferably, the sealable cover is made of an elastomeric material. For example, the sealable cover may be made from a silicon based elastomeric material, such as one called Viton™.

Preferably, the sealable cover and/or cover assembly are made of durable materials. This allows them to be re-used.

According to a third aspect of the invention there is also provided a tool for curing a composite component, the tool comprising a lay-up surface for laying-up layers of an uncured composite component, wherein the lay-up surface has a main surface portion and wherein the main surface portion is provided with a number of raised portions on the main surface portion, and/or a number of attachment points for attaching raised portions on the main surface portion.

The raised portions provide a required geometric profile to allow the layers to be layed-up and layers to abut against the raised portions so that the same required profile of the component is achieved. The required profile may be an edge with, for example, a castellated shape or may be an internal hole and/or recessed area within the component. A raised portion may comprise a dowel (for example, made of nylon) for providing a hole in the component, for example, for a rivet or other fastener.

Preferably, the raised portions are removable from the main surface portion to aid laying-up of the composite component to and/or extraction of the composite component from the lay-up surface.

Preferably, the raised portions comprise through-holes for attaching the raised portions to corresponding attachment points on the main surface portion. The raised portions may be attached with fasteners, such as bolts.

Preferably, the raised portions comprise an attachment device that projects outwardly from the raised portion in a direction away from the main surface portion. The attachment device can be used to secure an insert in the composite component.

More preferably, the attachment device is a split pin. This allows one or more layers of the uncured composite component to be cut in the split of the pin.

Preferably, the attachment device comprises a pluck-out hole, into which a tool can be inserted in order to pluck-out the raised portion from the main surface portion.

Preferably, a surface of the raised portion comprises a cutting guide groove. This facilitates the cutting of one or more layers of the uncured composite component, as a cutter may be placed in the groove and moved along the groove to cut the layers.

Preferably, either the raised portion comprises a biased retaining stud that is biased to project outwards from the raised portion, such that it may be retained in a stud-receiving recess in the main surface portion, or the raised portion comprises a stud-receiving recess for receiving a biased retaining stud that is biased to project outwards from the main surface portion. This allows for the raised portion to be secured in the main surface portion but also allow it to be efficiently removed.

More preferably, the stud-receiving recess or biased retaining stud of the main surface portion is located in a socket and the wall of the socket or the wall of the raised portion acts as a cam that exerts force on the stud as the raised portion attached to the main surface portion.

According to a fourth aspect of the invention, there is also provided a tool for curing a composite component, the tool comprising a main body and a lay-up surface portion for laying-up layers of an uncured composite component, wherein the lay-up surface portion is removable from the main body of the tool. This allows the lay-up surface portion to be removed and replaced with a different lay-up surface portion. This allows the tool to be used to manufacture a number of different shaped components.

Preferably, the removable lay-up surface portion comprises an electrical connector and the main body comprises a corresponding electrical connection point. This allows the lay-up surface portion to be provided with electricity, for example for powering a heating element.

Preferably, the removable lay-up surface portion comprises a vacuum port connector and the main body comprises a corresponding vacuum port. This allows the lay-up surface portion to be provided with a vacuum supply.

Preferably, the removable lay-up surface portion comprises alignment members and the main body comprises corresponding alignment members, to allow the removeable lay-up surface portion to be aligned with the main body.

According to a fifth aspect of the invention there is also provided a method of manufacturing a composite component, the method including the steps of laying-up an uncured composite component on the lay-up surface of the tool of any preceding claim, curing the composite component, and extracting a cured component from the lay-up surface.

The curing process may involve the steps of heating the uncured composite component and also providing a vacuum to the uncured composite component.

According to a sixth aspect of the invention there is also provided a composite component manufactured by the method described above.

Preferably, the composite component forms at least part of a piece of aircraft furniture, such as an aircraft seat shell.

It will of course be appreciated that features described in relation to one aspect of the present invention may be incorporated into other aspects of the present invention. For example, the method of the invention may incorporate any of the features described with reference to the apparatus of the invention and vice versa. Also, features described in relation to one aspect of the apparatus of the present invention may be incorporated into other aspects of the apparatus of the present invention.

DESCRIPTION OF THE DRAWINGS

Embodiments of the present invention will now be described by way of example only with reference to the accompanying schematic drawings of which.

DETAILED DESCRIPTION

FIGS. 1 and 3 to 8 show a heat mould tool 1 according to a first embodiment of the invention. The tool 1 is provided for the manufacture of composite seat shrouds 3, constructed from layers of pre-preg material, such as that shown in FIG. 2. The seat shroud 3 forms the main back bone of a seat shell structure for use on an aircraft.

Figure 1:
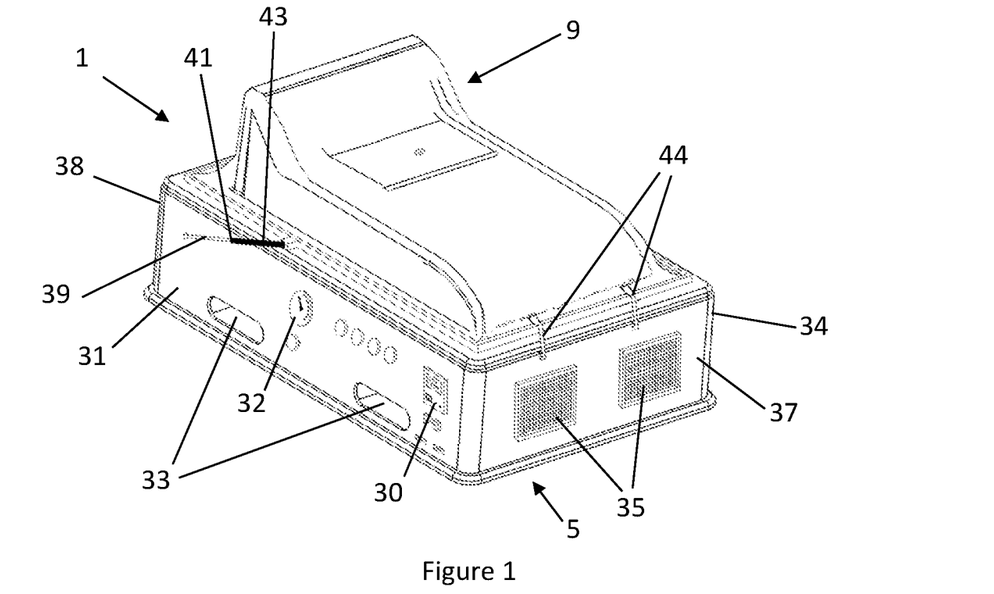
FIG. 1 shows a perspective view of a heat mould tool.

The tool 1 comprises a base 5 that supports a tooling surface structure 7, providing a tooling surface 8, shaped to match the desired surface profile of the composite seat shroud 3, upon which the composite seat shroud 3 is layed-up and cured, and a cover 9 that, in use, envelops and creates a sealed environment around the tooling surface 8. The tooling surface 8 is roughly 0.9 m×1.3 m. It extends typically 100 mm beyond the desired "edge of part" of the seat shroud 3. The tool 1 has a plug (not shown) for plugging into a conventional power socket and providing power to the tool.

Figure 3:
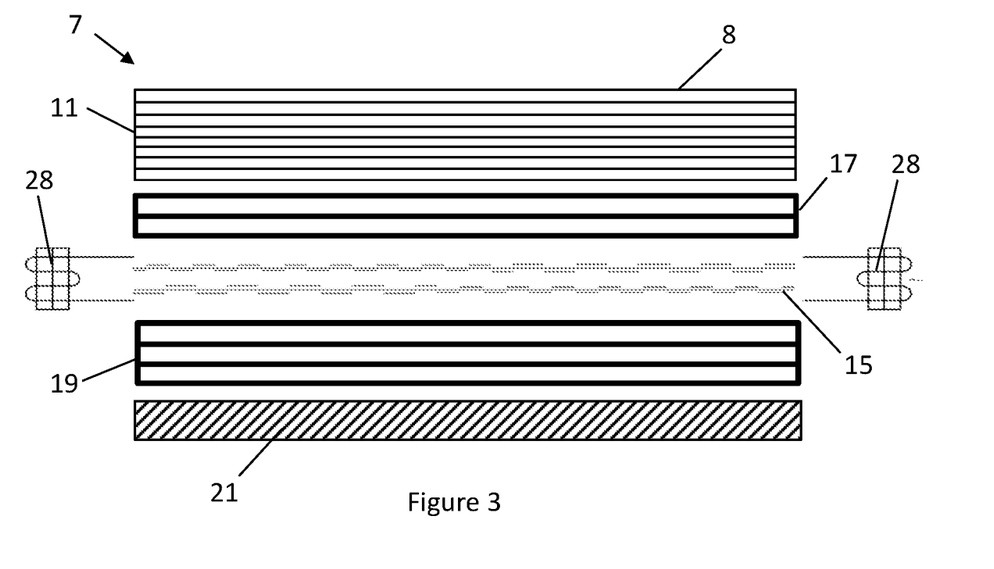
FIG. 3 shows a cross-sectional view of part of a composite tooling surface structure of the heat mould tool of FIG. 1.
Figure 4:
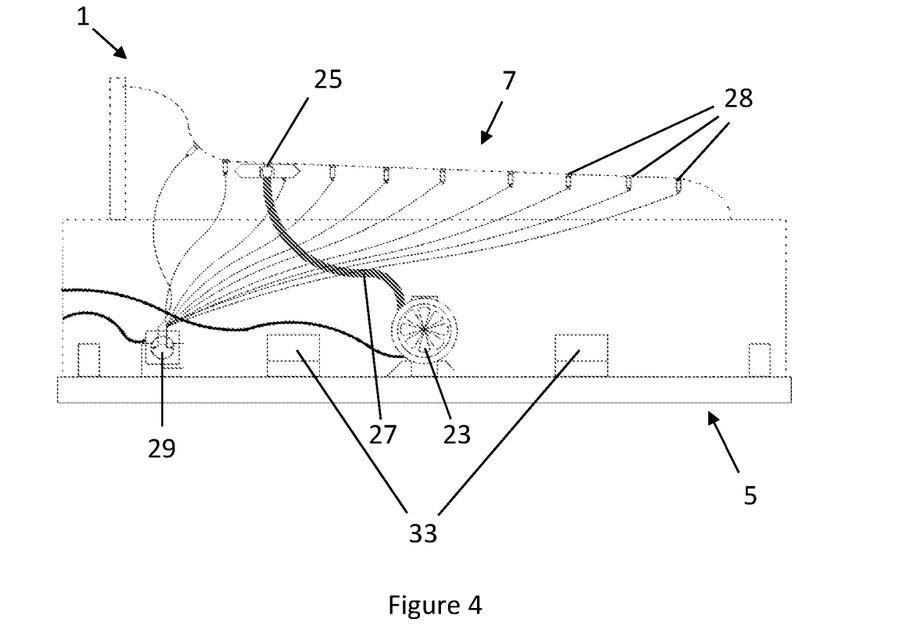
FIG. 4 shows a cross-sectional view of the heat mould tool of FIG. 1.

The tooling surface structure 7, a cross-sectional schematic of part of which is shown in FIG. 3, comprises an upper-most portion of eight plies (cured at 180° C.) of carbon fibre composite 11, the upper surface of the uppermost carbon fibre ply 8 providing the tooling surface 8. The upper surface 8 of the uppermost carbon fibre ply is therefore maintained with a surface finish of 0.4 μm or better to ensure that the cured composite seat shroud 3 has an adequate surface finish. Below the eight plies of carbon fibre composite 11, the tooling surface structure 7 comprises a layer of tooling surface heating elements 15 (electrical heater wires) that are electrically insulated from the rest of the tooling surface structure 7 by being sandwiched between an upper layer of two glass fibre composite plies 17 and a lower layer of three glass fibre composite plies 19 (the glass fibre composite plies cured at 135° C.). At the edges of the tooling surface structure 7, electrodes 28 are attached to the tooling surface heating elements 15 so that they may be connected to a power source 29 (taking power from the power socket) in the base 5 of the tool 1. The lower layer of three glass fibre composite plies 19 is painted with a thermally insulating coating 21 in order to minimise heat transfer into the base 5 of the tool 1 during the curing process.

Figure 8:
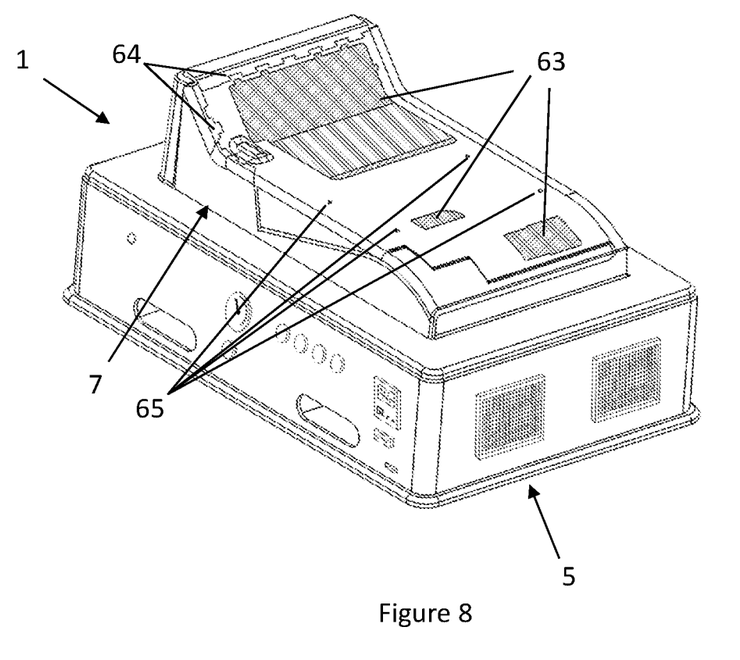
FIG. 8 shows a perspective view of the heat mould tool of FIG. 1 without the cover and with removable nylon dowels and blocks located at cut-out locations on the composite tooling surface structure.

The tooling surface structure 7 is provided with a number of removable side panels (or edge bars) 64 of the tooling surface 8 to produce a shaped edge of the cured component. The shaped edge is castellated. The tooling surface structure 7 is provided with a number of sunken portions 66 in the tooling surface 8, into which correspondingly shaped nylon rectangular blocks 63 may be placed so as to protrude above the tooling surface 8. The tooling surface structure 7 is provided with a number of rounded apertures 67 into which nylon dowels 65 may be placed. These provide rivet/fastener holes in the cured component. Thus, the tooling surface 8 is provided with inserts that cut-outs 62 in pre-preg layers can be abutted against during lay-up, thereby providing clean internal and external edges and holes in the cured seat shroud 3.

The tooling surface structure 7 is mounted on top of the base 5 of the tool 1 such that the uncured composite seat shroud 3 can be layed-up directly onto the tooling surface 8. The base 5 comprises a hollow composite box that houses a dry-vane vacuum pump 23 and the power source 29, as can be seen in the cross-section shown in FIG. 4. The vacuum pump 23 is in fluid communication with a vacuum port 25 on the tooling surface 8 via a vacuum line 27. The power source 29 is connected to the electrodes 28 of the tooling surface heating elements 15. In use, the vacuum pump 23 is operated to obtain the desired vacuum pressure at the tooling surface 8 and the heating elements 15 are operated to obtain the desired temperature at the tooling surface 8. During the cure process, the tool 1 is thermally monitored by temperature sensors or thermocouples (not shown) and thermally controlled by a PID (programmable interface device) 30, such as a proportional-integral-derivative controller (for keeping the heating and cooling rates constant), the display of which is located on a first side 31 of the base 5. A pressure gauge 32 is situated on the first side 31 of the base 5 such that the vacuum pressure level at the tooling surface 8 can also be monitored (vacuum pressure sensors not shown).

There is also an emergency stop switch, switches/buttons (such as warm, vacuum, run, stop), and a USB port on the side 31. The USB port can be used to input settings to the PID 30. The PID 30 is also able to store program settings, and can be controlled by a user. The USB port may also be used to export the temperature and/or pressure profile of a cure cycle so that the cycle can be reproduced on a different tool.

Forklift apertures 33 (each 21 cm×10 cm) are located on the first side 31 and on a second opposite side 34 of the base 5, such that the tool 1 (weighing 60 kg) may be transported by a forklift (or similar) by inserting the forks of the forklift into the forklift apertures 33 located on one of the sides of the base 5, passing the forks through the interior of the base 5 and out of the forklift apertures 33 located on the other side of the base 5. Each aperture edge is covered with a rubber material to help prevent damage to the apertures 33.

Two air vents 35 (each 20 cm×20 cm) are located on a front end 37 and on a back end 38 of the base 5 in order to encourage air flow through the interior of the base 5 and therefore cool the vacuum pump 23, power source 29, and PID 30 contained therein.

Figure 5:
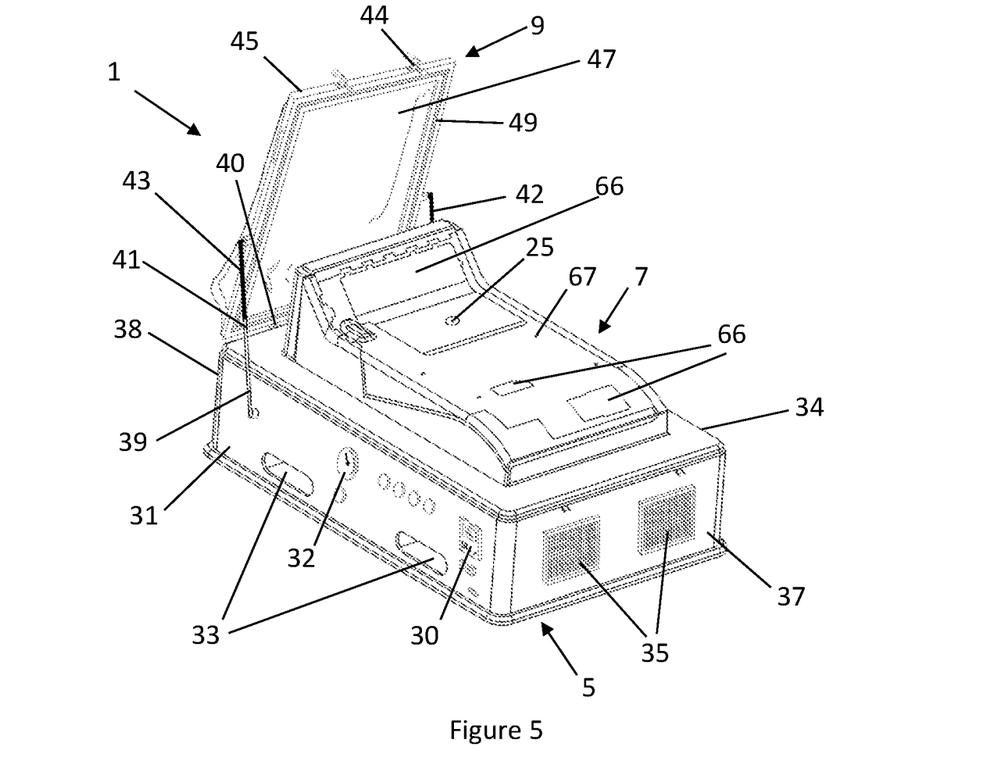
FIG. 5 shows a perspective view of the heat mould tool of FIG. 1 with a cover open.

Two hinges 40 (one of which is shown in FIG. 5) are located on the upper most edge of the back end 38 of the base 5, and connect the base 5 with the cover 9 of the tool 1, such that the cover 9 is pivotally mounted on the base 5 and can be opened as shown in FIG. 5. Once opened, the cover 9 is held in the open position by two gas springs 41, 42; one at each side of the cover 9. Each gas spring 41, 42 comprises a piston rod 39 and a cylinder 43. The piston rod is connected to a side of the base 5 and the cylinder 43 is connected to the same side of the cover 9. The gas springs 41, 42 also prevent the cover 9 from being pushed back further than the open position (at approximately 90° to the base 5). When the tool is being used to cure the composite seat shroud 3, the cover 9 is locked in the closed position by two toggle clamps 44 that secure the front end of the cover 9 to the front end 37 of the base 5.

The cover 9 comprises a rectangular aluminium frame 45 that in the closed position sits on top of the base 5 such that the frame 45 surrounds the tooling surface 8. A flexible vacuum bagging sheet 47 spans the interior of the frame and is connected within an inner edge 48 of the frame 45 such that the vacuum bagging sheet 47 of the cover 9, when the cover 9 is in the closed position, envelops the tooling surface 8. A neoprene (or similar) seal 49 runs around the underside of the frame 45 at the interface between the frame 45 and the base 5 ensuring that when the cover 9 is in the closed position the tooling surface 8 is situated within a sealed environment, the pressure of which may be controlled by the vacuum pump 23.

Figure 6:
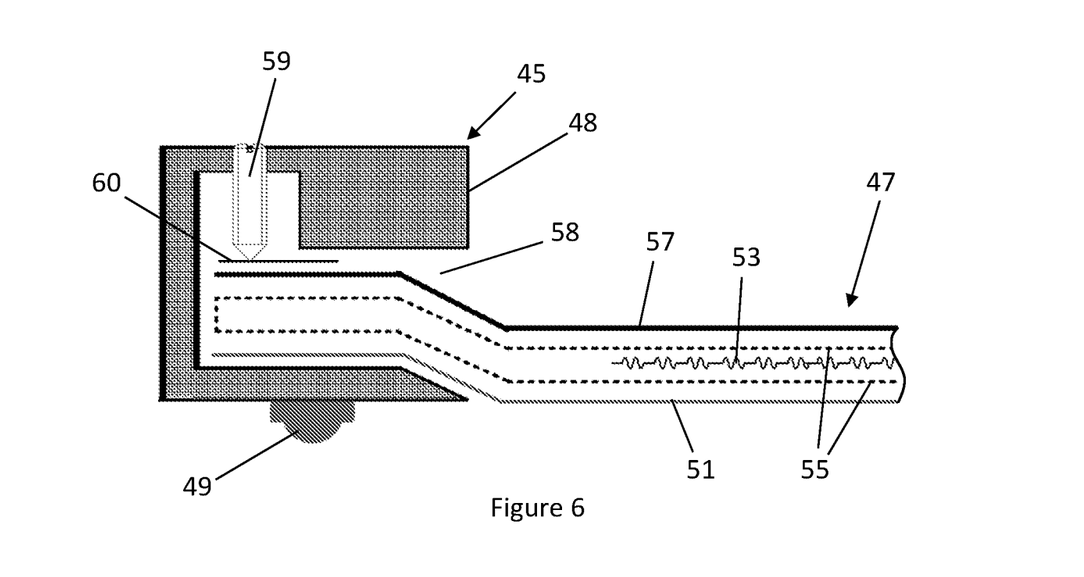
FIG. 6 shows a cross-sectional view of a section of a vacuum bag and frame of the heat mould tool of FIG. 1.

A cross-sectional schematic of the frame 45 and vacuum bagging sheet 47 is shown in FIG. 6. The vacuum bagging sheet 47 has a bottom layer 51 made of a synthetic rubber sold under the trademark Viton by DuPont and, in use under the pressure applied by the vacuum pump 23, is in contact with the upper surface of the lay-up of the composite seat shroud 3 on the tooling surface 8. Above the bottom layer 51, sits a layer of vacuum bagging sheet heating elements 53 distributed along the length of the vacuum bagging sheet 47 in order to provide a heat source to the upper surface of composite seat shroud 3 during the cure process. The vacuum bagging sheet heating elements 53 are connected to the power source 29 and controlled by the PID 30, both situated within the base 5 of the tool 1. The vacuum bagging sheet heating elements 53 are sandwiched between two thermally conductive heating blankets 55 that aid with the distribution of heat. The uppermost layer of the vacuum bagging sheet 47 is a thermally insulating layer 57 that prevents heat escaping from the cover 9.

The edges of the layers that comprise the vacuum bagging sheet 47 are received within a channel 58 that runs around the interior edge 48 of the aluminium frame 45 and are clamped within the channel 58 under the action of clamping screws 59 situated at intervals around the perimeter of the frame 45. Each screw 59 enters an upper side of the frame, substantially opposite the side comprising the neoprene seal 49, and act directly on a clamping plate 60 situated within the channel 58 such that the edges of the vacuum bagging sheet 47 can be clamped between the clamping plate 60 and a lower interior face of the channel 58. It is expected that the vacuum bagging sheet 47 will be capable of being used for at least 300 curing operations. It can be replaced at a suitable time.

Figure 7:
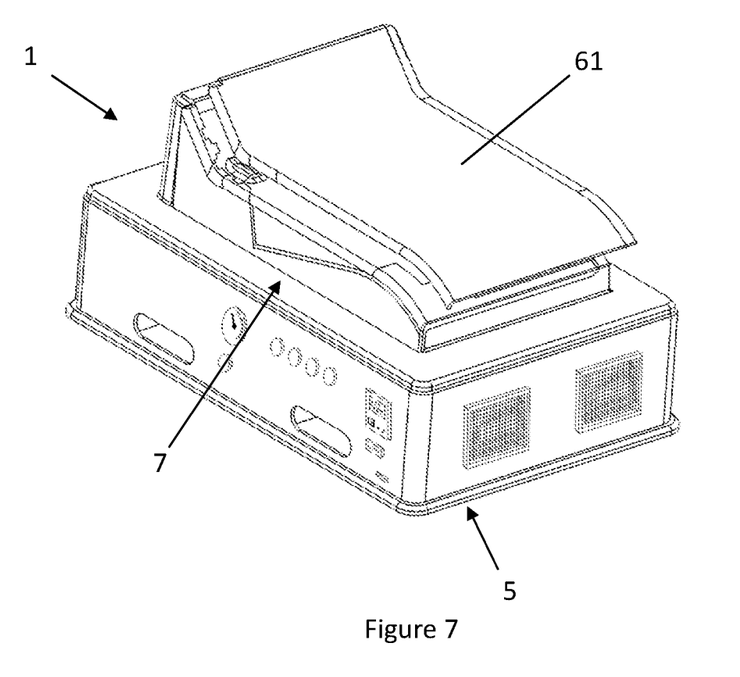
FIG. 7 shows an exploded perspective view of the heat mould tool of FIG. 1 without the cover and with an intensifier layer.

An intensifier layer 61, shown in FIG. 7, may be used to enhance the uniformity of the pressure distribution across the upper surface of the composite seat shroud 3 during the cure process. The intensifier layer 61 comprises a silicon sheet that has been moulded to match the desired profile of the upper surface of the composite seat shroud 3 and, in use, sits on top of the composite seat shroud 3 during the curing process, beneath the vacuum bagging sheet 47.

Figure 2:
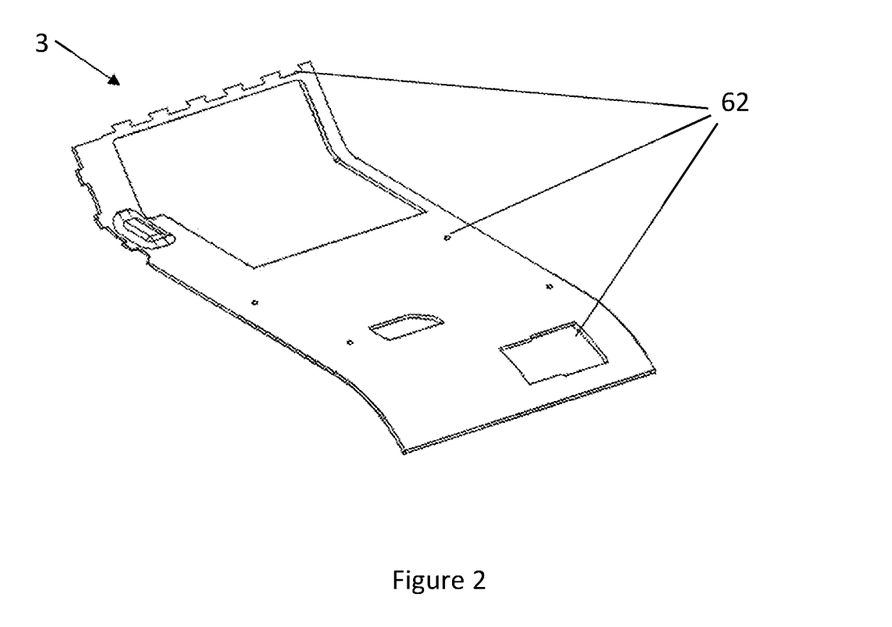
FIG. 2 shows a perspective view of a composite seat shroud manufactured using the heat mould tool of FIG. 1.

As mentioned, the tool is used in the manufacture of composite components constructed from pre-preg material, such as the composite seat shroud 3 shown in FIG. 2. In use, the tooling surface 8 of the tool 1 (provided with the appropriate inserts) is prepared with a coating of a suitable release agent, such as that sold in the UK under the trademark Frekote 700-NC by Henkel Ltd., and then warmed to 45° C. in order to aid the drape of the uncured pre-preg layers of the composite seat shroud 3 and facilitate the lay-up process onto the tooling surface 8. A number of cut-outs 62 are located in the layers of the composite seat shroud 3, and as the layers are layed-up by hand on to the tooling surface 8, the cut-outs are lined up around the side panels/edge bars 64 and with the blocks 63 and dowels 65.

Once the uncured composite seat shroud 3 has been layed-up on the tooling surface 8, it is covered with a release film (not shown) and then the intensifier layer 61 is placed on top. A breather cloth (not shown) is then placed on top of the intensifier layer 61 in order to encourage a uniform air pressure distribution and absorb any resin that bleeds out of the edges of the shroud 3 during the cure process. The cover 9 is then moved to the closed position and locked via the clamps 44. The appropriate vacuum pressure is applied via the pump 23, typically a vacuum of 1 bar (or 29.5 inHg) is applied to de-bulk the lay-up. Furthermore, it is possible to de-bulk the uncured composite component during the lay-up process after laying each layer of the component. It is noted that the tool 1 has a maximum vacuum loss of 1 inHg per 5 minutes.

Figure 9:
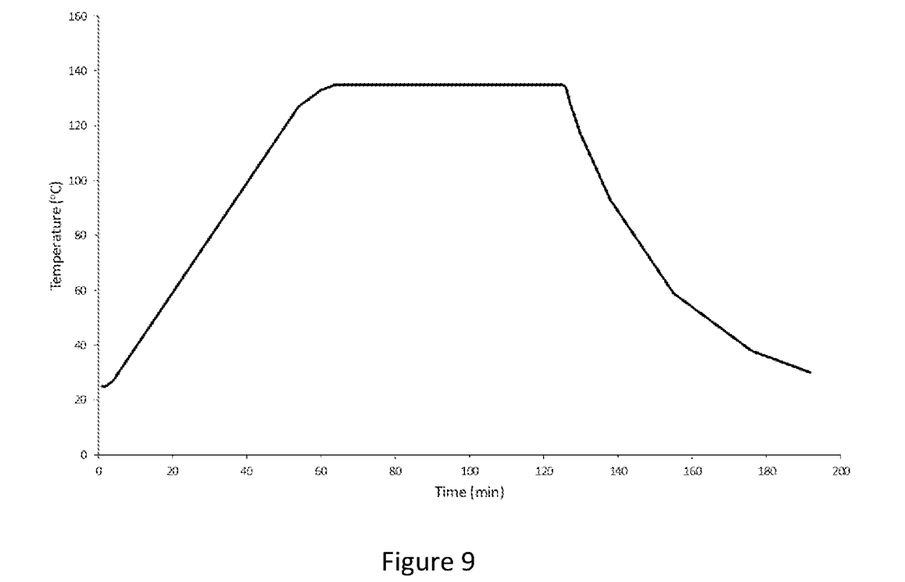
FIG. 9 shows a graph of a typical cure temperature cycle.

The PID 30 is programmed with the appropriate times and temperatures of the ramp-up (heating to a desired temperature at a given rate), dwell (at desired temperature for a given time) and cooling (to room temperature at a given rate) stages of the cure process as provided by the pre-preg manufacturer and the cure run cycle is started. The PID controls the temperature by controlling the heat provided by the heating elements 15 and 53. A typical cure temperature cycle with a cure temperature of 135° C. is shown in FIG. 9. It is noted that the heating elements 15 and 53 are capable of achieving a ramp-up rate of between 0.5 and 5° C./min, a dwell temperature of between 25 and 150° C. with a variation of ±5° C. between top and bottom surfaces of the shroud 3.

Once the cure cycle is complete and the composite seat shroud 3 has cooled sufficiently, the cover 9 is unlocked by clamps 44 and moved to the open position. The breather cloth, intensifier layer 61, and release film are removed to expose the upper surface of the cured composite seat shroud 3. The nylon blocks 63 and dowels 65 are then removed. The cured composite seat shroud 3 can then be removed from the tooling surface 8. It can then be polished around its perimeter to achieve a clean "edge of part".

A second embodiment of the tool comprises an arrangement which expedites the post-cure cooling of the tool. The frame 145 of the cover of the second embodiment of the invention, shown in FIG. 10, comprises a plurality of air outlets 170 positioned along the interior edge 148 of the frame. The air outlets 170, shown in FIG. 10 with arrows indicating the cooling air flow direction, are positioned such that cooling air may be expelled from them onto the surface of the cured composite component.

Figure 10:
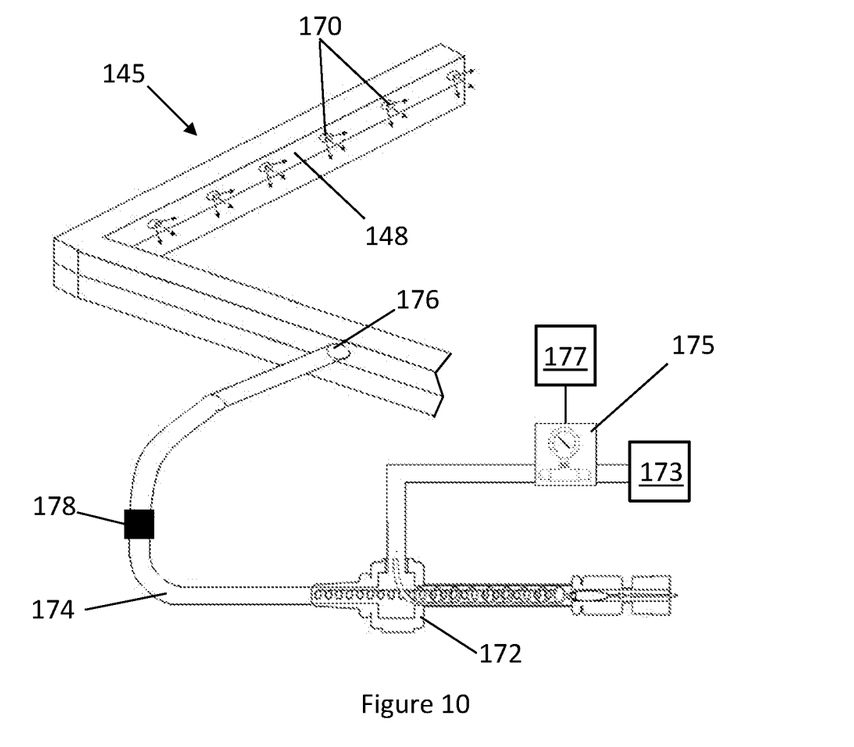
FIG. 10 shows a schematic view of a cooling arrangement of a second embodiment heat mould tool.

The cooling air is supplied by a vortex tube 172, the vortex tube 172 being fed by a compressed air supply 173. A regulator 175, which can regulate the flow of cooling air, may be positioned between the compressed air supply 173 and the vortex tube 172. A programmable logic control device (PLC) 177 may be connected to the regulator 175 such that the cooling air flow volume can be adjusted to suit the required cooling rate.

A flexible conduit 174 passes the cooling air from the vortex tube 172 to a connection inlet 176 located on the exterior edge of the frame 145. An air amplifier 178 may be connected in series with the flexible conduit 174 which allows for alteration of the flow rate of the cooling air. The cooling air flows from the connection inlet 176 to the air outlets 170 through an air flow channel (not shown) located inside the frame 145.

Figure 11:
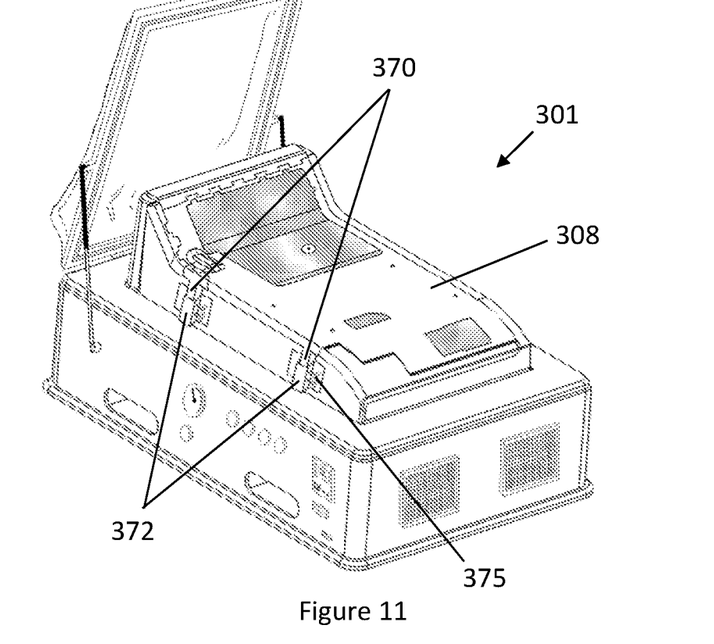
FIG. 11 shows a perspective view of a heat mould tool according to a third embodiment.
Figure 12:
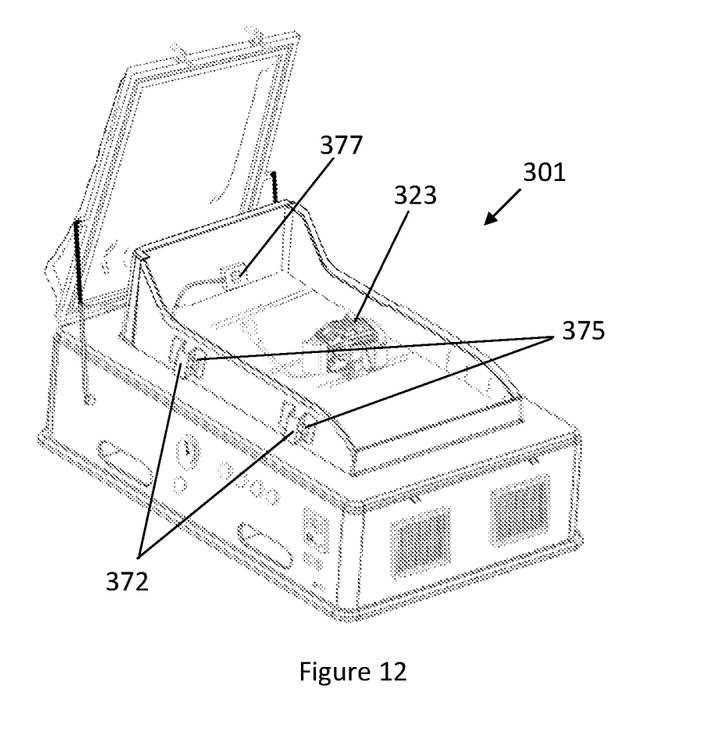
FIG. 12 shows a perspective view of the heat mould tool of FIG. 11, with the removable tooling surface removed.

FIG. 11 shows a perspective view of a heat mould tool 301 according to a third embodiment. The tool 301 is substantially the same as the heat mould tool 1 according to the first embodiment of the invention. However, the heat mould tool 301 now comprises a removable tooling surface 308. The heat mould tool 301 is shown in FIG. 12 with the removable tooling surface 308 removed. This arrangement advantageously allows different tooling surfaces to be used with the tool 301, for example a first removable tooling surface 308 shown in FIG. 13 and a second removable tooling surface 312 shown in FIG. 14.

Figure 13:
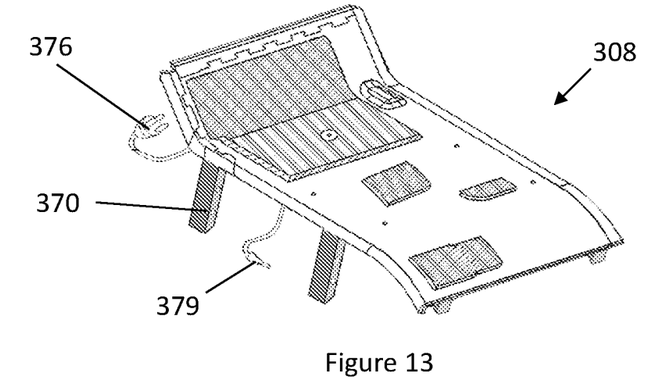
FIG. 13 shows a perspective view of a first tooling surface for use with the tool of FIGS. 11 and 12.
Figure 14:
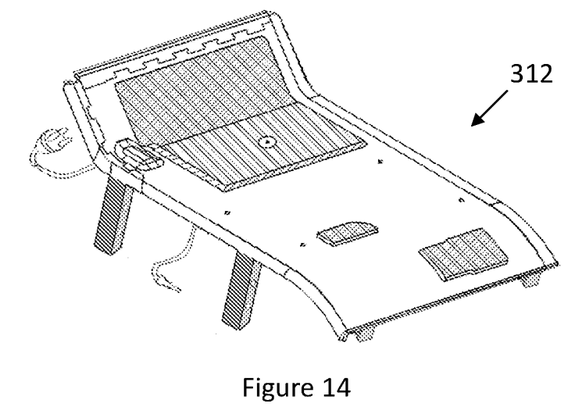
FIG. 14 shows a perspective view of a second tooling surface for use with the tool of FIGS. 11 and 12.

The removable tooling surfaces 308, 312 comprises four alignment members 370 which project outwardly from the rear side of the removable tooling surface (the rear side being opposite to the side onto which the composite is layed-up). The removable tooling surfaces can therefore be mounted upon the heat mould tool 301 by inserting the alignment members 370 into corresponding openings 372 located on the main body of the heat mould tool 301 and lowering the removable tooling surface 308, 312 into contact with the main body of the tool 301. Once the tooling surface is in place, the removable tooling surface 308, 312 is fastened to the main body of the tool 301 by tightening clamping screws 375 which are arranged to clamp the alignment members 370 within the openings 372.

Figure 15:
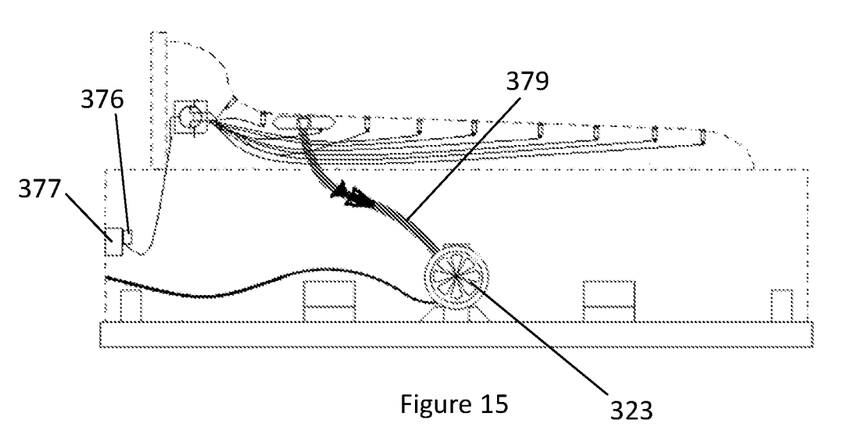
FIG. 15 shows a cross-sectional view of the heat mould tool of FIG. 11 with plug and vacuum hose connected.

An electrical plug 376 is located on the rear side of the removable tooling surfaces 308, 312. The plug 376 is arranged to be connected to a corresponding electrical socket 377 on the main body of the heat mould tool 301 such that power may be supplied to the heating elements located within the removable tooling surfaces 308, 312. Similarly, a vacuum hose 379 also extends from the rear side of the removable tooling surfaces 308, 312. The vacuum hose 379 is arranged to be connected to the pump 323 located within the main body of the heat mould tool 301 such that vacuum pressure may be applied to the removable tooling surfaces 308, 312. The plug 376 and vacuum hose 379 are shown as connected to the heat mould tool in FIG. 15.

Figure 16:
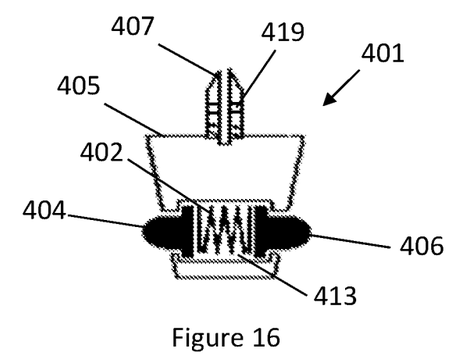
FIG. 16 shows a cross-sectional view of a frusto-conical insert for use with a heat mould tool according to a fourth embodiment.

A fourth embodiment of the tool, not shown, is arranged such that various removable inserts are mountable upon the tooling surface. The inserts enable composite panels to be cured with pre-formed cut-outs or with inserts cured in situ. FIG. 16 shows a cross-sectional view of a frusto-conical insert 401 that is arranged to be mounted within a frusto-conical socket 403 located upon the tooling 408 surface, shown in FIG. 17. When mounted upon the tooling surface, the tooling end of insert 405 (the tooling end corresponding to the end with the largest diameter) sits flush with the tooling surface 408. The insert is secured in place by a spring 402 and double-ended stud 404, 406 arrangement contained within a chamber 413 located in the body of the insert 401, as shown in FIG. 16.

A first stud 404 and a second stud 406 are positioned diametrically opposite one another within the chamber 413 and are arranged such that the tips of the studs 404, 406 pass through holes in the walls of the chamber and project out of diametrically opposite sides of the insert 401. The end of each stud 404, 406 (the end being the distal end located within the body of the insert) is flanged so as to be of a larger diameter than the hole through which the stud tip passes. A helical spring 402 is positioned between the studs 404, 406 such that a first end of the spring 402 reacts on the flanged end of the first stud 404 and the second end of the spring reacts on the flanged end of the second stud 406. The spring 402 is therefore arranged to push both studs 404, 406 outwardly from within the body of the insert 401. The studs are retained within the chamber 413 by their flanged ends abutting the inner wall of the chamber 413.

Figure 17:
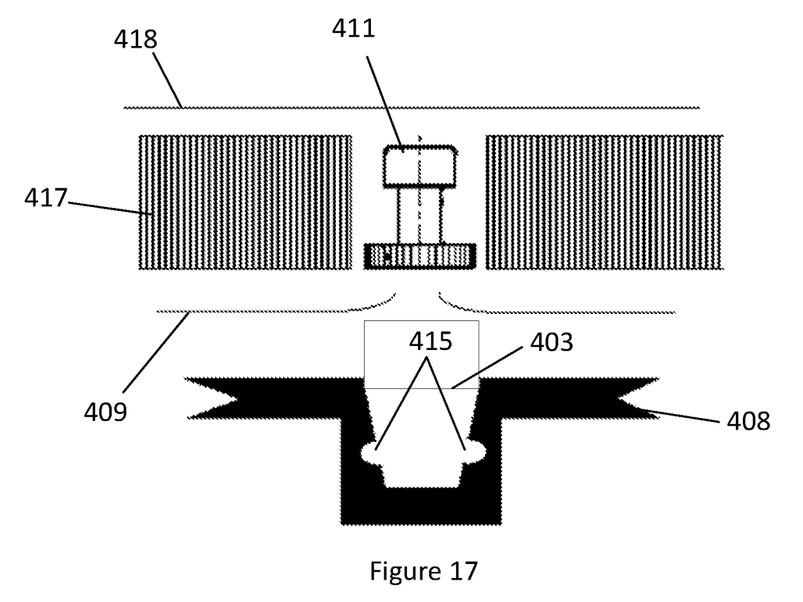
FIG. 17 shows a schematic cross-sectional view of a composite structure and heat mould tool surface of the heat mould tool according to a fourth embodiment.

Two corresponding stud-shaped recesses 415 are located on diametrically opposite sides of the frusto-conical socket 403 located in the tooling surface 408 and are arranged such that when the insert 401 is mounted within the socket 403, the studs 404, 406, sit within the recesses 415. Therefore, as the insert is inserted into the socket, the walls of the socket 403 act as a cam which pushes the studs into the body of the insert 401, against the force of the spring 402. When fully inserted into the socket 403, the spring 402 pushes the studs 404, 406 outwardly into the recesses 415. This arrangement ensures that the insert 401 is securely mounted upon the tooling surface 408.

A split pin 407 projects outwardly from the tooling end 405 of the insert 401. Such an arrangement allows for composite panels to be cured with inserts 411 in situ, thereby eliminating the post-cure steps of machining holes in a composite panel and mounting the inserts 411. A first layer of pre-preg 409 is layed-up directly onto the tooling surface 408 such that the split pin 407 pierces the pre-preg 409. A knife blade (not shown) may be passed within the split of the split pin 407 to cut the layed-up pre-preg 409 in the vicinity of the split pin 407. An insert 411 may then be placed onto the split pin 407, such that the split pin 407 is received within the insert. The remainder of the panel, for example a honey-comb core 417 and a pre-preg face sheet 418, may then be layed-up around the insert 411.

Post cure, the insert 401 may be removed from the tooling surface by passing a suitable tool through a pluck-out hole 419 that passes in a radial direction through the split-pin 407 and pulling the insert 401 out of the tooling surface. This action causes the walls of the socket to again push the studs 404, 406 into the chamber 413 of the insert in a camming action.

Figure 18:
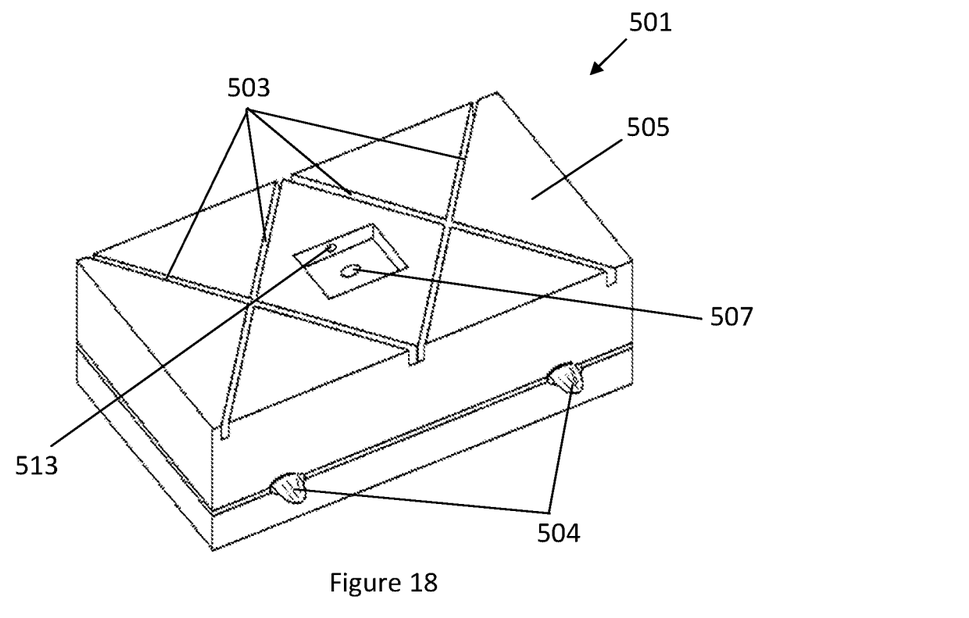
FIG. 18 shows a perspective view of a cuboidal block insert for use with a heat mould tool according to a fifth embodiment.

A cuboidal block insert 501 for use with a fifth embodiment heat mould tool is shown in FIG. 18. The block insert may be secured within a corresponding cuboidal socket on a tooling surface of the heat mould tool by a spring and stud 504 system located within the block insert 501 that acts substantially the same way as the spring 402 and stud system 404, 406 employed in the previously described frusto-conical insert 401. Four cutting lines 503 run diagonally across the top face 505 of the block insert 501 (the top face 505 being the uppermost face of the block insert 501 when it is mounted within the cuboidal socket on the tooling surface) in a criss-cross pattern. The cutting lines 503, which are grooves in the surface of the block insert 501, facilitate the cutting of the cut-outs in the pre-preg during the laying-up process as a knife may be placed in the groove and moved in a straight line by following the cutting line 503 across the top face 505 of the block insert 501.

Similarly to the frusto-conical insert 401, the block insert 501 comprises a pin 507 which projects out of the top face 505 of the block insert 501. During the lay-up process the pre-preg is placed on to the block insert 501 and the pin 507 pierces the pre-preg. The pin 507 thereby positions the pre-preg and holds it in place during cutting.

Post cure, the block insert 501 may be removed from the tooling surface by passing a suitable tool through a pluck-out hole 513 located in the top face and pulling the insert out of the tooling surface.

Figure 19:
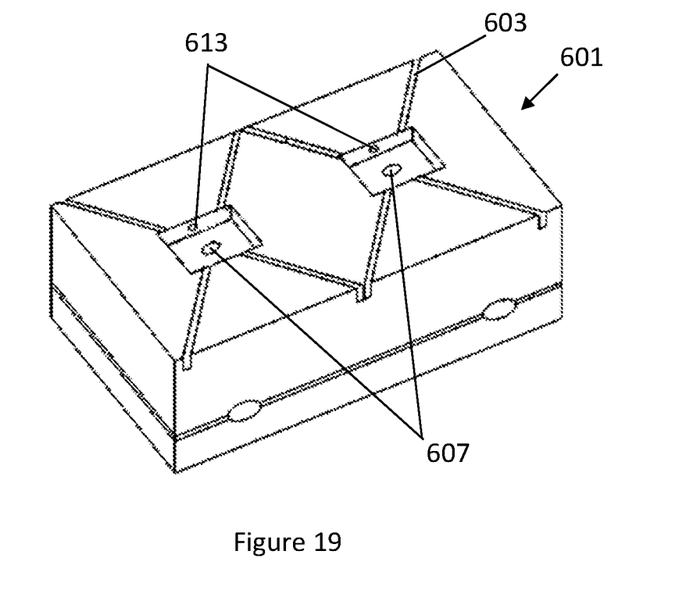
FIG. 19 shows a perspective view of a second cuboidal block insert for use with a heat mould tool according to a fifth embodiment.

A second cuboidal block insert 601 is shown in FIG. 19. The block insert is substantially the same as the block insert 501. However, the cuboidal block insert 601 comprises two pins 607; one at each of the intersection points of the cutting lines 603 on the top surface of the block insert 601. The block insert 601 also comprises two pluck-out holes 613 which facilitate removal of the insert from the tooling surface.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

A similar tool 1 may be used to produce any composite component, not just a seat shroud 3. For example, the composite component may be significantly larger or significantly smaller than a seat shroud 3 or a different shape.

The composite component may be a monolithic laminate (comprising just pre-preg layers) or a sandwich laminate (also comprising a comb structure) or a combination.

The tooling surface 8, intensifier layer 61 and cover 9 etc. may therefore be made to any suitable size/shape.

The intensifier layer 61 may be made with carbon fibre combined with silicon.

The tool 1 may be provided with any required number/shape/size of sunken portions and corresponding nylon dowels 65, blocks 63 and side panels/edge bars 64. For example, the side panels/edge bars 64 may provide a wavy or a zig-zag shape and the blocks 63 may be triangular or round.

The forklift apertures may be provided on one side of the base 5 only.

The cover 9 may be provided with a handle on one/each side to aid opening and closing of the cover 9.

The tool 1 may be provided with a network cable connection so that settings can be sent to the PID 30 using the internet.

The tool 1 may be provided with rubber feet to minimize the impact when placing the tool 1 down and to ensure that the tool 1 does not shift positions.

The tooling surface structure 7 may be formed of any suitable materials and/or any number of plies of composite material.

The tool 1 may comprise a first tooling surface structure 7 which may be removed and replaced with a second tooling surface structure 7a such that two different composite components may be manufactured using the same tool 1.

The tool 1 may be provided with a number of separate tooling surfaces 8 such that a plurality of composite components may be manufactured during a single cure cycle.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A tool for curing a composite component, the tool comprising:
a lay-up surface for laying-up layers of an uncured composite component,
a cover assembly for moving in relation to the lay-up surface to cover a layed-up uncured composite component on the lay-up surface, the cover assembly comprising a sealable cover for sealing around the uncured composite component on the lay-up surface to form a sealed zone, and
a vacuum port for providing a vacuum to the sealed zone, wherein the tool further comprises at least one heating element within the sealed zone for heating the uncured composite component and the sealable cover is pivotally mounted in relation to the lay-up surface.

2. The tool as claimed in claim 1, wherein the cover assembly comprises a cover heating element for heating an upper side of the layed-up uncured composite component.

3. The tool as claimed in claim 2, wherein the cover heating element comprises a heating blanket formed of a wire mesh, embedded within a carrier material.

4. The tool as claimed in claim 1, wherein the sealable cover is a three-dimensionally shaped cover that holds its shape such that the sealable cover has a volume associated with it for containing the uncured composite component.

5. The tool as claimed in claim 4, wherein the sealable cover is shaped such that the sealable cover has a lower edge region that can seal around the lay-up surface and a roof region that holds a shape of the roof region to extend above the lay-up surface.

6. The tool as claimed in claim 1, wherein the sealable cover is supported by a frame structure.

7. The tool as claimed in claim 1, wherein the tool further comprises a cooling apparatus for cooling the composite component.

8. The tool as claimed in claim 7, wherein the cooling apparatus comprises a vortex tube for supplying cooling air.

9. The tool as claimed in claim 1, wherein the at least one heating element is embedded beneath a top layer of the lay-up surface.

10. A tool for curing a composite component, the tool comprising a main body and a lay-up surface portion for laying-up layers of an uncured composite component, wherein the lay-up surface portion is removable from the main body of the tool, and wherein the removable lay-up surface portion comprises a removable electrical connector and the main body comprises an electrical connection point corresponding to the removable electrical connector of the removable lay-up surface portion and
  wherein the removable electrical connector is configured such that it can be interchangeably connected and disconnected from the electrical connection point.

11. The tool as claimed in claim 10, wherein the removable lay-up surface portion comprises a vacuum port connector and the main body comprises a corresponding vacuum port.

12. The tool as claimed in claim 10, wherein the removable electrical connector comprises a plug, and the electrical connection point comprises a socket.

\* \* \* \* \*